United States Patent
Lefebvre (10) Patent No.: US 6,689,711 B2
(45) Date of Patent: Feb. 10, 2004

(54) METHODS OF PRODUCING OXYGEN REDUCTION CATALYST

(75) Inventor: Mark C. Lefebvre, Oceanside, CA (US)

(73) Assignee: Metallic Power, Inc., Carlsbad, CA (US)

( * ) Notice: Subject to any disclaimer, the term of this patent is extended or adjusted under 35 U.S.C. 154(b) by 0 days.

(21) Appl. No.: 09/973,490

(22) Filed: Oct. 9, 2001

(65) Prior Publication Data

US 2003/0069129 A1 Apr. 10, 2003

(51) Int. Cl.[7] .................. B01J 21/18; B01J 27/24; H01M 4/00; H01M 4/86; H01M 4/90
(52) U.S. Cl. .............. 502/185; 502/101; 502/182; 502/183; 502/184; 502/200; 429/27; 429/40; 429/44
(58) Field of Search .............. 429/40, 44, 27; 502/101, 182–185, 200

(56) References Cited

U.S. PATENT DOCUMENTS

| | | | |
|---|---|---|---|
| 3,767,466 A | 10/1973 | McCoy et al. | 136/131 |
| 3,811,952 A | 5/1974 | Siwersson et al. | 136/86 |
| 3,847,671 A | 11/1974 | Leparulo et al. | 136/86 |
| 3,879,225 A | 4/1975 | Backhurst et al. | 136/86 |
| 3,981,747 A | 9/1976 | Doniat et al. | 429/15 |
| 3,985,581 A | 10/1976 | Stachurski et al. | 429/51 |
| 4,105,829 A | 8/1978 | Venero | 429/15 |
| 4,127,701 A | 11/1978 | Symons et al. | 429/19 |
| 4,147,839 A | 4/1979 | Solomon et al. | 429/15 |
| 4,172,924 A | 10/1979 | Warszawski | 429/15 |

(List continued on next page.)

FOREIGN PATENT DOCUMENTS

| | | |
|---|---|---|
| EP | 0568822 A2 | 11/1993 |
| EP | 0755088 A2 | 1/1997 |
| FR | 2639767 | 11/1988 |
| FR | 2669775 | 11/1990 |
| JP | 51-494439 | 4/1976 |
| WO | WO 00/38260 | 6/2000 |

OTHER PUBLICATIONS

Appleby, A. J. et al.: *The C.G.E. Circulating Zinc/Air Battery: A Practical Vehicle Power Source*; Journal of Power Sources; 1976/1977; vol. 1; pp. 17–24, no month.

Appleby, A.J. et al.: *Charge–Discharge Behavior of the C.G.E. Circulating Zinc–Air Vehicle Battery*; Society of Automotive Engineers, Cobo Hall, Detroit; Feb. 28–Mar. 4, 1977.

Cooper, J., et al.; *Demonstration of a Zinc/Air Fuel Battery to Enhance the Range and Mission of Fleet Electric Vehicles: Preliminary Results in the Refueling of a Multicell Module*; 29th Intersociety Energy Conversion Engineering Conference; Aug. 8, 1994; 8 pages.

Cooper, J.; *How the Zinc/Air Battery is Refueling the Competitiveness of Electric Vehicles*; Science & Technology Review ; Oct. 1995; pp. 7–13.

*Primary Examiner*—Mark L. Bell
*Assistant Examiner*—Patricia L. Hailey
(74) *Attorney, Agent, or Firm*—Howrey Simon Arnold & White, LLP (57) ABSTRACT

Methods of making an oxygen reduction catalyst are described in which carbon black, one or more metal-containing and/or nitrogen-containing precursor(s) are provided to a reaction zone, and the carbon black is rendered catalytically active. To form this catalytic activity, the carbon black and one or more metal-containing and/or nitrogen-containing precursor(s) are introduced to a reaction zone heated to a temperature of between about 600 and about 1000 degrees Celsius, and maintained together in the reaction zone for a cumulative time between 5 seconds and 240 minutes.

64 Claims, 4 Drawing Sheets

U.S. PATENT DOCUMENTS

| | | | |
|---|---|---|---|
| 4,182,383 A | 1/1980 | Adomitis et al. | 141/5 |
| 4,198,475 A | 4/1980 | Zaromb | 429/15 |
| 4,287,273 A | 9/1981 | Harney et al. | 429/153 |
| 4,352,864 A | 10/1982 | Struthers | 429/18 |
| 4,485,154 A | 11/1984 | Remick et al. | 429/14 |
| 4,730,153 A | 3/1988 | Breting et al. | 320/14 |
| 4,828,939 A | 5/1989 | Turley et al. | 429/38 |
| 4,842,963 A | 6/1989 | Ross, Jr. | 429/21 |
| 4,950,561 A | 8/1990 | Niksa et al. | 429/27 |
| 5,006,424 A | 4/1991 | Evans et al. | 429/15 |
| 5,156,925 A | 10/1992 | Lapp | 429/19 |
| 5,168,905 A | 12/1992 | Phallen | 141/1 |
| 5,188,911 A | 2/1993 | Downing et al. | 429/70 |
| 5,196,275 A | 3/1993 | Goldman et al. | 429/27 |
| 5,208,526 A | 5/1993 | Goldman et al. | 320/2 |
| 5,240,893 A * | 8/1993 | Witherspoon | 502/101 |
| 5,260,144 A | 11/1993 | O'Callaghan | 429/14 |
| 5,318,861 A | 6/1994 | Harats et al. | 429/21 |
| 5,346,778 A | 9/1994 | Ewan et al. | 429/19 |
| 5,360,680 A | 11/1994 | Goldman et al. | 429/27 |
| 5,372,981 A * | 12/1994 | Witherspoon | 502/155 |
| 5,378,329 A | 1/1995 | Goldstein et al. | 204/115 |
| 5,405,713 A | 4/1995 | Pecherer et al. | 429/49 |
| 5,411,815 A | 5/1995 | Goldstein | 429/50 |
| 5,434,020 A | 7/1995 | Cooper | 429/210 |
| 5,441,820 A | 8/1995 | Siu et al. | 429/17 |
| 5,476,826 A * | 12/1995 | Greenwald et al. | 502/180 |
| 5,558,947 A | 9/1996 | Robison | 429/13 |
| 5,569,551 A | 10/1996 | Pedicini et al. | 429/27 |
| 5,578,183 A | 11/1996 | Cooper | 205/64 |
| 5,635,051 A | 6/1997 | Salas-Morales et al. | 205/602 |
| 5,849,427 A | 12/1998 | Siu et al. | 429/19 |
| 5,869,200 A | 2/1999 | Nunnally | 429/10 |
| 5,876,867 A * | 3/1999 | Itoh et al. | 429/44 |
| 5,880,536 A | 3/1999 | Mardirossian | 307/44 |
| 5,885,727 A | 3/1999 | Kawatsu | 429/17 |
| 5,929,538 A | 7/1999 | O'Sullivan et al. | 307/66 |
| 5,952,117 A | 9/1999 | Colborn et al. | 429/27 |
| 5,958,210 A | 9/1999 | Siu et al. | 205/602 |
| 5,961,928 A | 10/1999 | Maston et al. | 422/110 |
| 5,969,435 A | 10/1999 | Wilhelm | 307/64 |
| 5,984,986 A | 11/1999 | Wiesheu et al. | 48/203 |
| 5,985,474 A | 11/1999 | Chen et al. | 429/17 |
| 5,999,888 A | 12/1999 | Aubee | 702/45 |
| 6,051,192 A | 4/2000 | Maston et al. | 422/110 |
| 6,067,482 A | 5/2000 | Shapiro | 700/286 |
| 6,153,329 A | 11/2000 | Raschilla et al. | 429/65 |
| 6,153,555 A | 11/2000 | Narula et al. | 502/303 |
| 6,162,555 A | 12/2000 | Gutierrez et al. | 429/15 |
| 6,186,254 B1 | 2/2001 | Mufford et al. | 180/65.3 |
| 6,230,496 B1 | 5/2001 | Hofmann et al. | 60/706 |
| 6,242,873 B1 | 6/2001 | Drozdz et al. | 318/139 |
| 6,296,958 B1 | 10/2001 | Pinto et al. | 429/15 |
| 6,321,145 B1 | 11/2001 | Rajashekara | 701/22 |
| 6,326,763 B1 | 12/2001 | King et al. | 320/101 |
| 6,428,931 B1 * | 8/2002 | Golovin | 429/224 |

* cited by examiner

METHODS OF PRODUCING OXYGEN REDUCTION CATALYST

FIELD OF THE INVENTION

This invention relates generally to catalysts for facilitating oxygen reduction reactions such as those which occur at an oxygen reduction cathode in a metal- or hydrogen-fuel cell, and, more specifically, to methods of producing such catalysts.

RELATED ART

Fuel cells, including without limitation metal- and hydrogen-fuel cells, are attractive alternatives to traditional energy source such as batteries and diesel generators since they can be refueled, do not consume fossil fuels, and do not give off noxious emissions into the atmosphere.

Typically, the cathode in such a fuel cell is an oxygen reduction cathode at which oxygen can be reduced according to the following reaction:

$$O_2 + 2H_2O + 4e^- \rightarrow 4OH^-$$

To facilitate this reaction, and to avoid the formation of undesirable byproducts such as peroxide, it is desirable to provide an oxygen reduction catalyst at the situs of the cathode.

SUMMARY

In one embodiment, the invention provides an oxygen reduction catalyst comprising (a) about 95 wt % to about 99.9 wt % carbon black, and (b) about 0.1 wt % to about 5.0 wt % metal, and (c) about 0.05 wt % to about 5.0 wt % nitrogen. In one configuration, the catalyst comprises a collection of oxygen reduction catalyst particles which particles are distributed in reasonably close proximity to each other. The collection may comprise no less than about 5 grams of the particles. In addition to particles, other configurations are possible such as where the catalyst is in the form of fibers, or in planar form. In one example, the catalyst which is produced is a carbon black supported catalyst in particulate form, which, in one non-limiting exemplary application, can be mixed with a binder and used to form the active layer of an oxygen reduction cathode for a fuel cell.

In a further embodiment, the invention provides a method for the high-throughput production of oxygen reduction catalyst. Again, the catalyst may be in any form, including, without limitation, particles, fibers, or planar form.

In one implementation, catalytic sites can be formed through the subject method on the surface of carbon black. To form these catalytic sites, one or more suitable metal-containing and/or nitrogen-containing precursor(s) is introduced to the carbon black. Optionally, a reducing agent can be mixed with the metal-containing and/or nitrogen-containing precursor(s) and/or the carbon black to enhance the formation of the catalytic sites. The reducing agent helps to provide a reducing atmosphere in the temperature range of between about 600 and 1000 degrees Celsius. These precursor(s) and the agent can be introduced in the form of a gas, a liquid (e.g., fine or micro droplet(s)), a solid (e.g., microparticles), or the like. The mixture of precursor(s), optional reducing agent, and carbon black can be heated to a temperature of between about 600 and 1000° Celsius for a time between about 5 seconds and 240 minutes. Under these conditions, catalytic sites, in the form of a combination of the nitrogen, the metal, and carbon, will form on the surface of the carbon black.

In one embodiment, this high-throughput production method can be practiced at a production rate of no less than about 10 grams per day, with additional embodiments of a production rate of no less than about 100 grams per day and/or of a production rate of no less than about 1000 grams per day being contemplated for use in accordance with the present invention. Typically, the production levels suitable for use in accordance with the present invention will be in the range(s) from about 10 grams per day to about 100 kilograms per hour. Various embodiments for performing this high-throughput production method are possible, including continuous, semi-continuous, intermittent, and batch processes.

In another embodiment, a mixture of a carrier gas, a nitrogen-containing gas, and optionally, a reducing gas, can be caused to continuously, semi-continuously, intermittently, or in a batch mode (one-time), flow through a furnace in which a reaction zone is maintained at the desired temperature of between about 600 and 1000 degrees Celsius. The gas flows along a flow path that extends through the reaction zone, exits the furnace, and (optionally) re-enters the furnace. The carrier gas is substantially chemically inert in relation to the carbon black particles and metal precursor. The metal precursor comprises a metal salt. The carbon black particles and metal salt are placed in a liquid solvent, such as water, whereby the metal salt is absorbed by the carbon black particles. The mixture is then atomized to form a suspension of fine droplets, and the suspension introduced into the flow of the gas mixture. The gas mixture carries the suspension through the reaction zone one or more iterations until the cumulative time that the suspension has passed within the reaction zone is between about 5 seconds and about 240 minutes. Through this process, the liquid solvent evaporates, and catalytic sites form on the surface of the carbon black particles. At this point, the particles can be separated from the mixture, through filtering or the like, at the point where the flow path exits the furnace. The result comprises a carbon black backed catalyst in particle form.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Introduction to Fuel Cells

Figure 1:
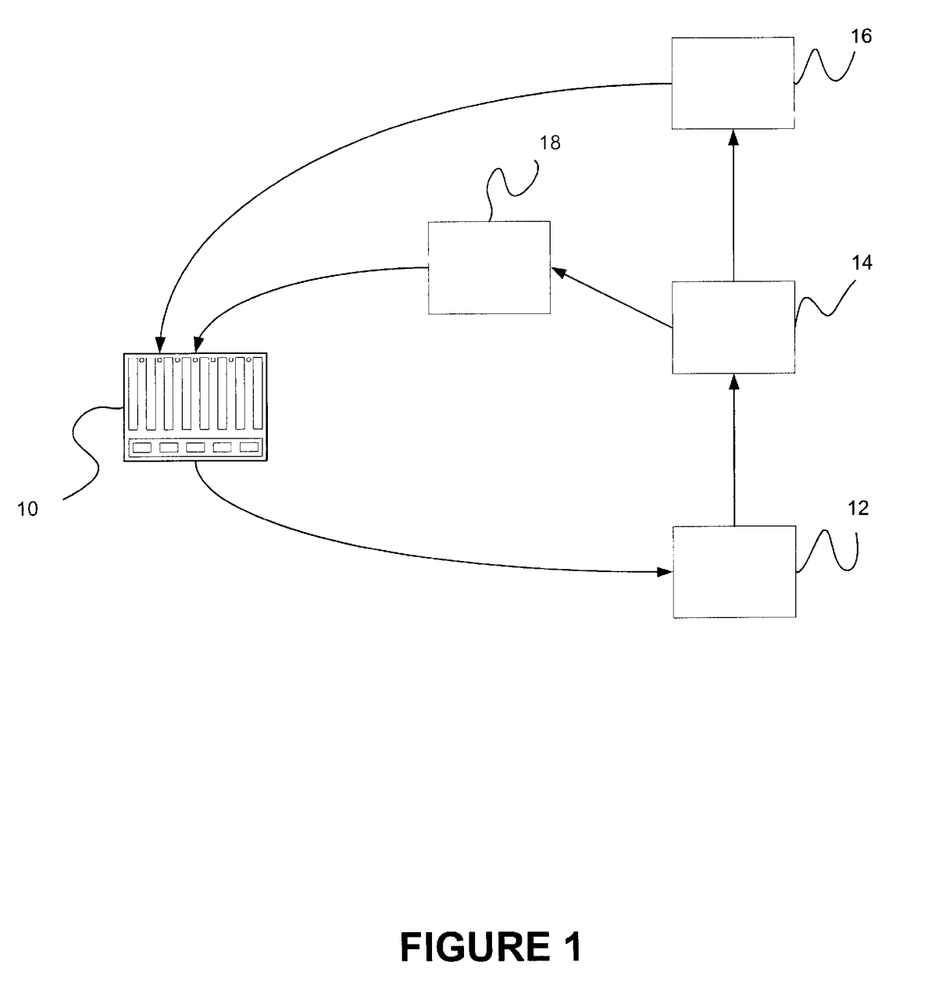
FIG. 1 is a block diagram of a fuel cell.

A block diagram of a fuel cell is illustrated in FIG. 1. As illustrated, the fuel cell comprises a power source 10, an optional reaction product storage unit 12, an optional regeneration unit 14, a fuel storage unit 16, and an optional second reactant storage unit 18. The power source 10 in turn comprises one or more cells each having a cell body defining a cell cavity, with an anode and cathode situated in each cell cavity. The cells can be coupled in parallel or series. In one implementation, they are coupled in series to form a cell stack.

The anodes within the cell cavities in power source 10 comprise the fuel stored in fuel storage unit 16. Within the cell cavities of power source 10, an electrochemical reaction takes place whereby the anode releases electrons, and forms one or more reaction products. Through this process, the anodes are gradually consumed.

The released electrons flow through a load to the cathode, where they react with one or more second reactants from an optional second reactant storage unit 18 or from some other source. This flow of electrons through the load gives rise to an overpotential (i.e., work) required to drive the demanded current, which overpotential acts to decrease the theoretical voltage between the anode and the cathode. This theoretical voltage arises due to the difference in electrochemical potential between the anode (Zn potential of −1.215V versus Hg/HgO reference at open circuit) and cathode ($O_2$ potential of +0.401V versus Hg/HgO reference at open circuit). When the cells are combined in series, the sum of the voltages for the cells forms the output of the power source.

The one or more reaction products can then be provided to optional reaction product storage unit 12 or to some other destination. The one or more reaction products, from unit 12 or some other source, can then be provided to optional regeneration unit 14, which regenerates fuel and/or one or more of the second reactants from the one or more reaction products. The regenerated fuel can then be provided to fuel storage unit 16, and/or the regenerated one or more second reactants can then be provided to optional second reactant storage unit 18 or to some other destination. As an alternative to regenerating the fuel from the reaction product using the optional regeneration unit 14, the fuel can be inserted into the system from an external source and the reaction product can be withdrawn from the system.

The optional reaction product storage unit 12 comprises a unit that can store the reaction product. Exemplary reaction product storage units include without limitation one or more tanks, one or more sponges, one or more containers, one or more vats, one or more barrels, one or more vessels, and the like, and suitable combinations of any two or more thereof. Optionally, the optional reaction product storage unit 12 is detachably attached to the system.

The optional regeneration unit 14 comprises a unit that can electrolyze the reaction product(s) back into fuel (e.g., hydrogen, metal particles and/or metal-coated particles, and the like) and/or second reactant (e.g., air, oxygen, hydrogen peroxide, other oxidizing agents, and the like, and suitable combinations of any two or more thereof). Exemplary regeneration units include without limitation water electrolyzers (which regenerate an exemplary second reactant (oxygen) and/or fuel (hydrogen) by electrolyzing water), metal (e.g., zinc) electrolyzers (which regenerate a fuel (e.g., zinc) and a second reactant (e.g., oxygen) by electrolyzing a reaction product (e.g., zinc oxide (ZnO)), and the like. Exemplary metal electrolyzers include without limitation fluidized bed electrolyzers, spouted bed electrolyzers, and the like, and suitable combinations of two or more thereof. The power source 10 can optionally function as the optional regeneration unit 14 by operating in reverse, thereby foregoing the need for a regeneration unit 14 separate from the power source 10. Optionally, the optional regeneration unit 14 is detachably attached to the system.

The fuel storage unit 16 comprises a unit that can store the fuel (e.g., for metal fuel cells, metal (or metal-coated) particles or liquid born metal (or metal-coated) particles or suitable combinations thereof, for hydrogen fuel cells, hydrogen or hydrogen containing compounds that can be reformed into a usable fuel prior to consumption). Exemplary fuel storage units include without limitation one or more tanks (for example, without limitation, a high-pressure tank for gaseous fuel (e.g., hydrogen gas), a cryogenic tank for liquid fuel which is a gas at operating temperature (e.g., room temperature) (e.g., liquid hydrogen), a metal-hydride-filled tank for holding hydrogen, a carbon-nanotube-filled tank for storing hydrogen, a plastic tank for holding potassium hydroxide (KOH) and metal (e.g., zinc (Zn), other metals, and the like) particles, and the like), one or more sponges, one or more containers (e.g., a plastic container for holding dry metal (e.g., zinc (Zn), other metals, and the like) particles, and the like), one or more vats, one or more barrels, one or more vessels, and the like, and suitable combinations of any two or more thereof Optionally, the fuel storage unit 16 is detachably attached to the system.

The optional second reactant storage unit 18 comprises a unit that can store the second reactant. Exemplary second reactant storage units include without limitation one or more tanks (for example, without limitation, a high-pressure tank for gaseous second reactant (e.g., oxygen gas), a cryogenic tank for liquid second reactant (e.g., liquid oxygen) which is a gas at operating temperature (e.g., room temperature), a tank for a second reactant which is a liquid or solid at operating temperature (e.g., room temperature), and the like), one or more sponges, one or more containers, one or more vats, one or more barrels, one or more vessels, and the like, and suitable combinations of any two or more thereof. Optionally, the optional second reactant storage unit 28 is detachably attached to the system.

In one embodiment, the fuel cell is a metal fuel cell. The fuel of a metal fuel cell is a metal that can be in a form to facilitate entry into the cell cavities of the power source 10. For example, the fuel can be in the form of metal (or metal-coated) particles or liquid born metal (or metal-coated) particles or suitable combinations thereof. Exemplary metals for the metal (or metal-coated) particles include without limitation zinc, aluminum, lithium, magnesium, iron, and the like.

In this embodiment, when the fuel is optionally already present in the anode of the cell cavities in power source 10 prior to activating the fuel cell, the fuel cell is pre-charged, and can start-up significantly faster than when there is no fuel in the cell cavities and/or can run for a time in the range(s) from about 0.001 minutes to about 100 minutes without additional fuel being moved into the cell cavities. The amount of time which the fuel cell can run on a pre-charge of fuel within the cell cavities can vary with, among other factors, the pressurization of the fuel within the cell cavities, and alternative embodiments of this aspect of the invention permit such amount of time to be in the range(s) from about 1 second to about 100 minutes or more, and in the range(s) from about 30 seconds to about 100 minutes or more.

Moreover, the second reactant optionally can be present in the fuel cell and pre-pressurized to any pressure in the range(s) from about 0.01 psi gauge pressure to about 200 psi gauge pressure prior to a an outage sense time after the controller sensing the power outage condition to facilitate the fuel cell's start-up in a timeframe significantly faster than when there is no second reactant present and no pre-pressurization in the fuel cell prior to the optional controller sensing the power outage condition. Optionally, the one or more second reactants are present in the power source 20 at a time prior to an outage sense time, which outage sense time is in the range(s) from about 10 microseconds to about 10 seconds after the controller has sensed outage of primary power to the one or more loads system. Optionally, this time is also after the controller has sensed outage of primary power to the one or more loads.

Moreover, in this embodiment, one optional aspect provides that the volumes of one or both of the fuel storage unit 16 and the optional second reactant storage unit 18 can be independently changed as required to independently vary the energy of the system from its power, in view of the requirements of the system. Suitable such volumes can be calculated by utilizing, among other factors, the energy density of the system, the energy requirements of the one or more loads of the system, and the time requirements for the one or more loads of the system. In one embodiment, these volumes can vary in the range(s) from about 0.001 liters to about 1,000,000 liters.

In one aspect of this embodiment, at least one of, and optionally all of, the metal fuel cell(s) is a zinc fuel cell in which the fuel is in the form of fluid borne zinc particles immersed in a potassium hydroxide (KOH) electrolytic reaction solution, and the anodes within the cell cavities are particulate anodes formed of the zinc particles. In this embodiment, the reaction products can be the zincate ion, or zinc oxide, ZnO, and the one or more second reactants can be an oxidant (for example, oxygen (taken alone, or in any organic or aqueous (e.g., water-containing) fluid (for example and without limitation, liquid or gas (e.g., air)), hydrogen peroxide, and the like, and suitable combinations of any two or more thereof). When the second reactant is oxygen, the oxygen can be provided from the ambient air (in which case the optional second reactant storage unit 18 can be excluded), or from the second reactant storage unit 18. Similarly, when the second reactant is oxygen in water, the water can be provided from the second reactant storage unit 18, or from some other source, e.g., tap water (in which case the optional second reactant storage unit 18 can be excluded).

In this embodiment, the particulate anodes are gradually consumed through electrochemical dissolution. In order to replenish the anodes, to deliver KOH to the anodes, and to facilitate ion exchange between the anodes and cathodes, a recirculating flow of the fuel borne zinc particles can be maintained through the cell cavities. This flow can be maintained through one or more pumps (not shown) or through some other means. As the potassiun hydroxide contacts the zinc anodes, the following reaction takes place at the anodes:

(1)

The two released electrons flow through a load to the cathode where the following reaction takes place:

(2)

The reaction product is the zincate ion,Zn(OH), which is soluble in the reaction solution KOH. The overall reaction which occurs in the cell cavities is the combination of the two reactions (1) and (2). This combined reaction can be expressed as follows:

(3)

Alternatively, the zincate ion, Zn(OH)

can be allowed to precipitate to zinc oxide, ZnO, a second reaction product, in accordance with the following reaction:

(4)

In this case, the overall reaction which occurs in the cell cavities is the combination of the three reactions (1), (2), and (4). This overall reaction can be expressed as follows:

(5)

Under real world conditions, the reactions (4) or (5) yield an open-circuit voltage potential of about 1.4V. For additional information on this embodiment of a zinc/air battery, the reader is referred to U.S. Pat. Nos. 5,952,117; 6,153,329; and 6,162,555, which are hereby incorporated by reference herein as though set forth in full.

The reaction product Zn(OH)

and also possibly ZnO, can be provided to reaction product storage unit 12. Optional regeneration unit 14 can then reprocess these reaction products to yield oxygen, which can be released to the ambient air or stored in second reactant storage unit 28, and zinc particles, which are provided to fuel storage unit 16. In addition, the optional regeneration unit 14 can yield water, which can be discharged through a drain or stored in second reactant storage unit 18. It can also regenerate hydroxide, OH$^-$, which can be discharged or combined with potassium to yield the potassium hydroxide reaction solution.

The regeneration of the zincate ion, Zn(OH)

into zinc, and one or more second reactants can occur according to the following overall reaction:

(6)

The regeneration of zinc oxide, ZnO, into zinc, and one or more second reactants can occur according to the following overall reaction:

$$ZnO \rightarrow Zn + \frac{1}{2}O_2 \qquad (7)$$

It should be appreciated that embodiments of metal fuel cells other than zinc fuel cells or the particular form of zinc fuel cell described above are possible for use in a system according to the invention. For example, aluminum fuel cells, lithium fuel cells, magnesium fuel cells, iron fuel cells, and the like are possible, as are metal fuel cells where the fuel is not in particulate form but in another form such as sheets or ribbons or strings or slabs or plates. Embodiments are also possible in which the fuel is not fluid borne or continuously recirculated through the cell cavities (e.g., porous plates of fuel, ribbons of fuel being cycled past a reaction zone, and the like). It is also possible to avoid an electrolytic reaction solution altogether or at least employ reaction solutions besides potassium hydroxide, for example, without limitation, sodium hydroxide, inorganic alkalis, alkali or alkaline earth metal hydroxides. See, for example, U.S. Pat. No. 5,958,210, the entire contents of which are incorporated herein by this reference. It is also possible to employ metal fuel cells that output AC power rather than DC power using an inverter, a voltage converter, and the like.

In a second embodiment of a fuel cell, the fuel used in the electrochemical reaction that occurs within the cells is hydrogen (e.g., derived from hydrogen for alkali-based fuel cell, and methanol/ethanol for acid-based fuel cell), the second reactant is oxygen, and the reaction product is water. In one aspect, the hydrogen fuel is maintained in the fuel storage unit 16, but the second reactant storage unit 18 can be omitted and the oxygen used in the electrochemical reaction within the cells can be taken from the ambient air. In another aspect, the hydrogen fuel is maintained in the fuel storage unit 16, and the oxygen is maintained in the second reactant storage unit 18. In addition, the optional reaction product storage unit 12 can be included or omitted, and the water resulting from discharge of the unit simply discarded or stored in the reaction product storage unit 12 (if present), respectively. Later, the optional regeneration unit 14 can regenerate water from another source, such as tap water, or from the reaction product storage unit 12 (if present) into hydrogen and oxygen. The hydrogen can then be stored in fuel storage unit 12, and the oxygen simply released into the ambient air or maintained in the second reactant storage unit 18.

In a third embodiment of a fuel cell, a metal fuel cell system is provided that has one, or any suitable combination of two or more, of the following properties: the system optionally can be configured to not utilize or produce significant quantities of flammable fuel or product, respectively; the system can provide backup power to the one or more loads for an amount of time limited only by the amount of fuel present (e.g., in the range(s) from about 0.01 hours to about 10,000 hours or more, and in the range(s) from about 0.5 hours to about 650 hours, or more); the system optionally can be configured to have an energy density in the range(s) from about 35 Watt-hours per kilogram of combined fuel and electrolyte added to about 400 Watt-hours per kilogram of combined fuel and electrolyte added; the system optionally can further comprise an energy requirement and can be configured such that the combined volume of fuel and electrolyte added to the system is in the range(s) from about 0.0028 L per Watt-hour of the system's energy requirement to about 0.025 L per Watt-hour of the system's energy requirement, and this energy requirement can be calculated in view of, among other factors, the energy requirement(s) of the one or more load(s) comprising the system (In one embodiment, the energy requirement of the system can be in the range(s) from 50 Watt-hours to about 500,000 Watt-hours, whereas in another embodiment, the energy requirement of the system can be in the range(s) from 5 Watt-hours to about 50,000,000 Watt-hours); the system optionally can be configured to have a fuel storage unit that can store fuel at an internal pressure in the range(s) from about −5 pounds per square inch (psi) gauge pressure to about 200 psi gauge pressure.

An advantage of fuel cells relative to traditional power sources such as lead acid batteries is that they can provide longer term backup power more efficiently and compactly. This advantage stems from the ability to continuously refuel the fuel cells using fuel stored with the fuel cell, from some other source, and/or regenerated from reaction products by the optional regeneration unit 14. In the case of the zinc fuel cell, for example, the duration of time over which energy can be provided is limited only by the amount of fuel which is initially provided in the fuel storage unit, which is fed into the system during replacement of a fuel storage unit 16, and/or which can be regenerated from the reaction products that are produced. Thus, the system, comprising at least one fuel cell that comprises an optional regeneration unit 14 and/or a replaceable fuel storage unit 16, can provide backup power to the one or more loads for a time in the range(s) from about 0.01 hours to about 10000 hours, or even more. In one aspect of this embodiment, the system can provide back-up power to the one or more loads for a time in the range(s) from about 0.5 hours to about 650 hours, or even more. Moreover, a system can optionally be configured to expel substantially no reaction product(s) outside of the system (e.g., into the environment).

Embodiments of the Invention

In one embodiment, the invention provides an oxygen reduction catalyst which comprises (a) about 95 wt % to about 99.9 wt % carbon black, and (b) about 0.1 wt % to about 5.0 wt % metal, and (c) about 0.05 wt % to about 5.0 wt % nitrogen. The catalyst may be in any form, including, without limitation, particles, fibers, or planar form. In one configuration, the catalyst is in the form of a collection of oxygen reduction catalyst particles, which particles are distributed in reasonably close proximity to each other. In one example, the collection comprises no less than about 5 grams of such particles. In another example, the collection comprises in the range(s) from about 5 grams of such particles to about 10000 kilograms of such particles.

As utilized herein, the term "catalyst" means any substance that initiates or facilitates a chemical reaction. Optionally, the components of the catalyst are bonded to each other, where bonding is ionic, covalent, or suitable combinations thereof.

As utilized herein, the term "reasonably close proximity" distributions includes, without limitation, commercially packaged distributions of the particles, uniform and nonuniform (e.g., random) distributions of the particles in a supported matrix (for example and without limitation, oxygen reduction cathode(s), near-planar arrays where the near-plane has a nominal thickness (i.e., in the range(s) from about 5 microns to about 1000 microns) and/or an area in the range(s) from about 10 cm$^2$ to about 500 m$^2$, optionally in the range(s) from about 10 cm$^2$ to about 1 m$^2$, and the like, and suitable combinations thereof).

As utilized herein, the phrase "oxygen-reduction cathode" means any electrode at which an oxygen reduction reaction occurs.

As utilized herein, the term "wt %" means percent by weight, comparing the weight of the component to the weight of the entire collection/particle, as applicable.

As utilized herein, the phrase "carbon black" means any carbon black suitable for use in accordance with the present invention including without limitation furnace blacks and thermal blacks, as well as carbon blacks having one or more of the following properties: a surface area of greater than 200 $m^2/gm$, optionally greater than 1000 $m^2/gm$; a resistivity of not greater than 0.01 $\Omega$-cm; and, an internal volume (DBP absorption test) of not less than 150 $cm^{3/100}$ gm, optionally not less than 300 $cm^{3/100}$ gin. The internal volume (DBP absorption test) of a carbon black sample can be readily determined utilizing the procedure set forth in ASTM D-2414-79. The carbon black that is used in accordance with the invention can comprise exactly one property selected from such group of properties. Alternatively or in addition, this carbon black can comprise exactly two properties selected from such group of properties. Alternatively or in addition, this carbon black can comprise all three properties selected from such group of properties.

As employed herein, the term "metal" means any (and suitable combinations of) alkali elements, alkaline earth elements, transition block elements, lanthanoid block elements, and actinoid block elements, in any form (e.g., metal element, metal-salt, metal-containing compound, and the like, and suitable combinations thereof). Exemplary metals include without limitation Fe, Co, Ru, Mn, Zn, Mo, Cr, Cu, V, Ni, Rh, and the like, and suitable combinations thereof. Alternatively or in addition, the metal can comprise Fe. Alternatively or in addition, the metal can comprise a metal salt and/or other metal-containing compounds. Exemplary metal salts or other metal-containing compounds include without limitation Fe salts, Fe-containing compounds (e.g., Fe(CO)), Co salts, Co-containing compounds, Ru salts, Ru-containing compounds, Mn salts, Mn-containing compounds, Zn salts, Zn-containing compounds, Mo salts, Mo-containing compounds, Cr salts, Cr-containing compounds, Cu salts, Cu-containing compounds, V salts, V-containing compounds, Ni salts, Ni-containing compounds, Rh salts, Rh-containing compounds, and the like, and suitable combinations thereof. Alternatively or in addition, the metal can comprise Fe salts, Fe-containing compounds (e.g., Fe(CO)), and the like, and suitable combinations thereof.

As employed herein, the term "nitrogen" means nitrogen in any non-element form (e.g., nitrogen-containing salt, nitrogen-containing compound, and the like, and suitable combinations thereof). Exemplary nitrogens include without limitation ammonia, acetonitrile, hydrazine, pyrrole, urea, any nitrogen-containing salt or nitrogen-containing compound that can serve as a nitrogen donor to a metal at a temperature in the range(s) from about 600 to about 1000 degrees Celsius, and the like, and suitable combinations thereof. Alternatively or in addition, the nitrogen-containing gas can comprise ammonia.

In one aspect, the collection of catalyst particles comprising not less than about 5 grams of such particles (which particles are distributed in reasonably close proximity to each other) in accordance with the invention is not less than about 5 grams of a carbon black supported catalyst in particulate form, which, in one non-limiting exemplary application, can be mixed with a binder and used to form the active layer of an oxygen reduction cathode for a fuel cell.

Figure 2:
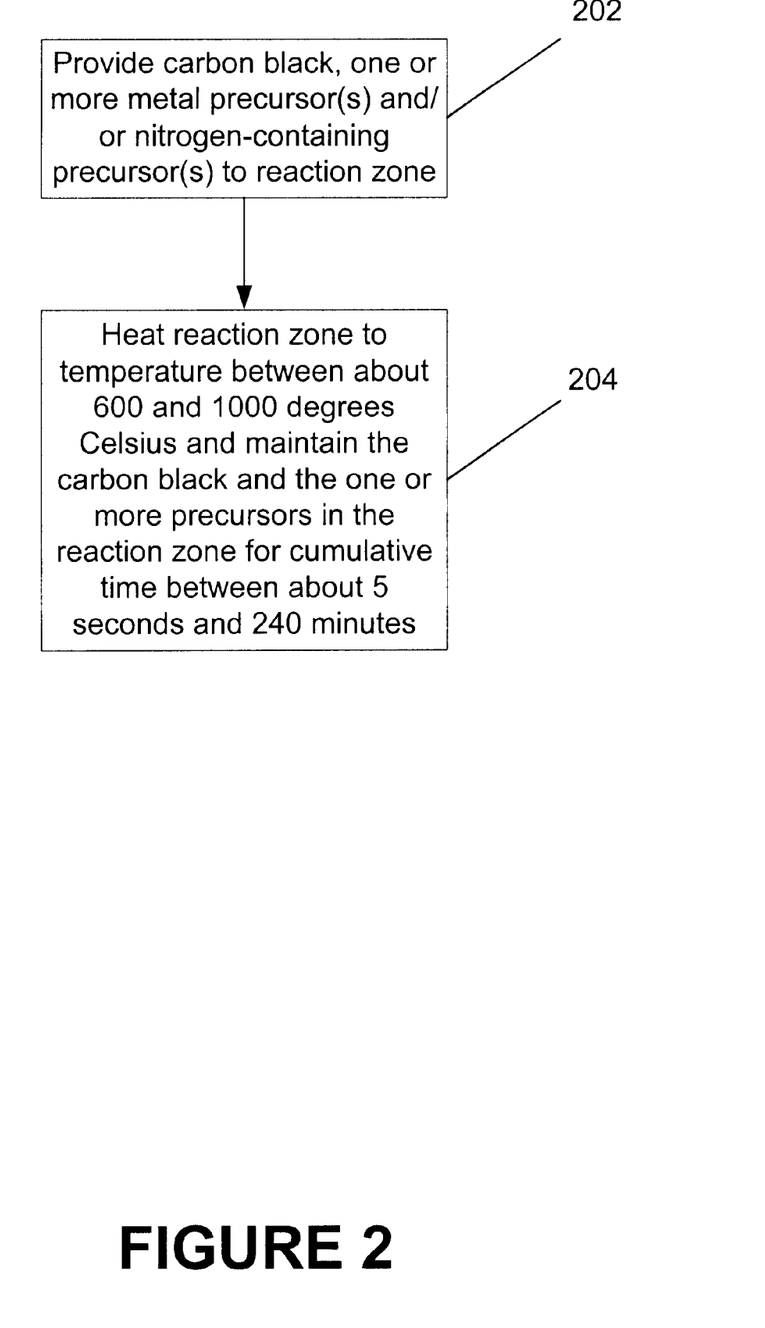
FIG. 2 is a flowchart of a first embodiment of a method according to the invention.

FIG. 2 is a flowchart of an embodiment of the invention providing a method for the high-throughput production of oxygen reduction catalyst is illustrated. The catalyst may be in any form, including, without limitation, particles, fibers, or planar form. A particulate catalyst can be, in one non-limiting exemplary application, mixed with a binder and used to form the active layer of an oxygen reduction cathode for a fuel cell. Alternatively, a planar catalyst may, in another non-limiting exemplary application, directly form the active layer of an oxygen reduction cathode for a fuel cell. In one example, the catalyst that is produced is a carbon black supported catalyst in particulate form. In particular, catalytic sites can be formed through an embodiment of the subject method on the surface of particles of carbon black.

Referring to FIG. 2, in step 202, carbon black, as well as one or more suitable metal-containing and/or nitrogen-containing precursor(s) are provided to a reaction zone.

As utilized herein, the term "metal-containing and/or nitrogen-containing precursor(s)" means one or more precursor fluid(s) that comprises metal, nitrogen, or both metal and nitrogen. As utilized herein, the term "fluid" includes without limitation any substance that is capable of flowing, such as without limitation gases, liquids (e.g., fine or micro droplet(s), vaporized liquid, and the like), and certain solid forms (e.g., microparticles, and the like), as well as mixed phase substances, with exemplary fluids including without limitation aqueous substances (e.g., any water-based or solvated fluid) and organic substances (i.e., any non-water based or solvated fluid). Suitable precursor fluid(s) that comprise metal capable of use in accordance with the present invention include without limitation fluid(s) containing any metal, as described above, that is optionally soluble or miscible in a fluid at a temperature in the range(s) from about 600 degrees C. to about 1000 degrees C., optionally from at least about 400 degrees C. Suitable precursor fluid(s) that comprise nitrogen capable of use in accordance with the present invention include without limitation fluid(s) containing any nitrogen, as described above, that is optionally soluble or miscible in a fluid at a temperature in the range(s) from about 600 degrees C. to about 1000 degrees C., optionally from at least about 400 degrees C. Suitable precursor fluid(s) that comprise both metal and nitrogen capable of use in accordance with the present invention include without limitation suitable combinations of precursor fluid(s) that contain metal and precursor fluid(s) that contain nitrogen, precursor fluid(s) that comprise metal macrocycle(s) (e.g., macrocycle(s) comprising metal and nitrogen, and the like) which can be heat treated to assist in forming oxygen reducing catalysts, and the like, and suitable combinations thereof.

Optionally, a reducing agent can be mixed with the metal-containing and/or nitrogen-containing precursor(s) and/or the carbon black to enhance the formation of the catalyst. Typically, this reducing agent is also a fluid. The reducing agent helps to provide a reducing atmosphere in the temperature range of between about 600 and 1000 degrees Celsius. Suitable reducing agents contemplated for use in accordance with the invention include without limitation hydrogen, carbon monoxide, any gas that can serve to provide a reducing atmosphere at a temperature in the range(s) from about 600 to about 1000 degrees Celsius, and the like, and suitable combinations thereof.

The carbon, the one or more suitable metal-containing and/or nitrogen-containing precursor(s) and the optional reducing agent can be mixed and/or optionally pre-heated in any combination of steps either prior to entry into, or during or after entry into, a reaction zone.

In step 204, the reaction zone is heated to a temperature of between about 600 and about 1000° Celsius, and the carbon, the one or more suitable metal-containing and/or nitrogen-containing precursor(s) and the optional reducing agent are maintained in the reaction zone while so heated for a cumulative time of between about 5 seconds and about 240 minutes.

This high-throughput production method can be practiced at a production rate of no less than about 10 grams per day, with additional embodiments of a production rate of no less than about 100 grams per day and/or of a production rate of no less than about 1000 grams per day being contemplated for use in accordance with the present invention. Typically, the production levels suitable for use in accordance with the present invention will be in the range(s) from about 10 grams per day to about 100 kilograms per hour. Various implementations for performing this method are possible, including continuous, semi-continuous, intermittent and one-time (e.g., batch) processes.

Furthermore, implementations of this method are possible where the reaction zone is heated to a temperature in one of the foregoing ranges of between about 700 and 900 degrees Celsius, or between about 725 and 875 degrees Celsius, or between about 775 and 825 degrees Celsius, or about 800 degrees Celsius.

Furthermore, implementations are possible where the cumulative time in which the carbon, the one or more suitable metal-containing and/or nitrogen-containing precursor(s) and the optional reducing agent are maintained in the reaction zone at a temperature in one of the foregoing ranges of between about 6 seconds to 120 minutes, or about 10 seconds to 60 minutes.

Figure 3:
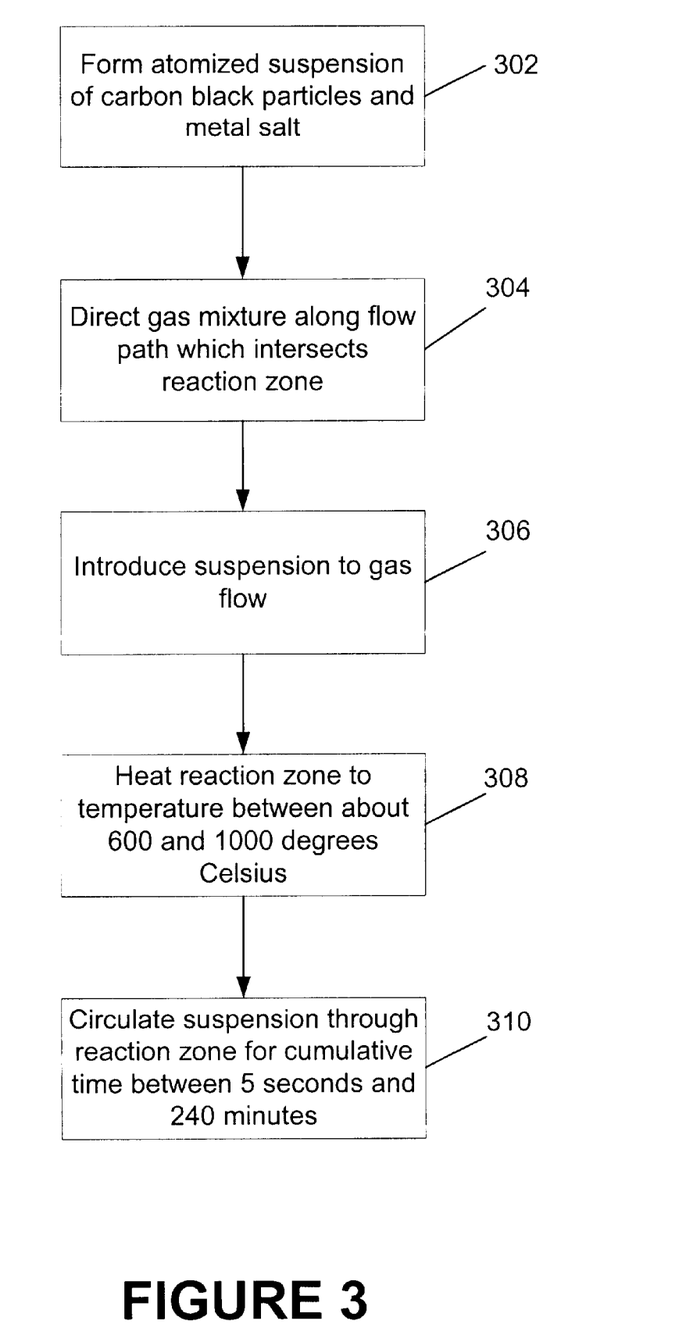
FIG. 3 is a flowchart of a second embodiment of a method according to the invention.

Referring to FIG. 3, a further embodiment of a method for the high-throughput production of oxygen reduction catalyst particles (e.g., carbon black supported catalysts, and the like) is illustrated.

In this embodiment, in step 302, an atomized suspension of carbon black particles and a metal-containing precursor (e.g., a metal salt in a liquid solvent) is formed. As employed herein, the phrase "atomized suspension" refers to a suspension formed into very fine droplets. In one embodiment, the droplets of the atomized suspension have their longest cross-sectional dimension between about 0.1 microns and about 100 microns.

In step 304, a mixture comprising a carrier gas, a nitrogen-containing precursor (e.g., a nitrogen-containing gas), and optionally, a reducing agent (e.g., a reducing gas), is caused to flow along a flow path that intersects a reaction zone. As employed herein, the phrase "carrier gas" refers to any carrier gas suitable for use in accordance with the present invention including without limitation nitrogen, argon, helium, any gas(es) or mixtures thereof that can be substantially non-reactive or inert in the presence of one or more nitrogen-containing and/or metal-containing precursor(s) and, optionally, a reducing agent at a temperature in the range(s) from about 600 to about 1000 degrees Celsius, and the like, and suitable combinations thereof. The flow through the reaction zone may be continuous, semi-continuous, intermittent, or one-time (e.g., batch).

In step 306, the atomized suspension is introduced to the gas flow. In step 308, the reaction zone is heated to a temperature of between about 600 and 1000 degrees Celsius. In step 310, the mixture carries the suspension into the reaction zone for a cumulative time of between about 5 seconds and 240 minutes. Through this process, catalytic sites form on the surface of the carbon particles. In one example, the catalytic sites are in the form of a combination of nitrogen, the metal, and carbon.

Alternatively or in addition, this high-throughput production method can be practiced at the previously described production rate.

Figure 4:
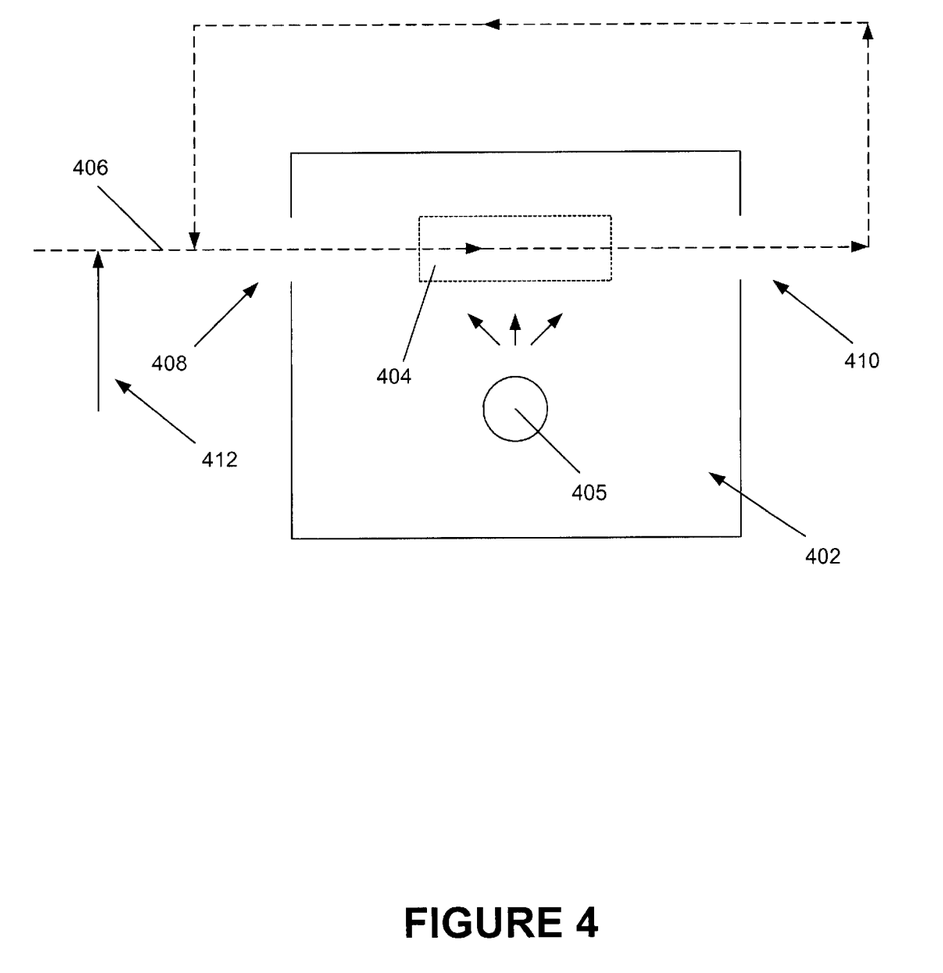
FIG. 4 is a simplified block diagram of a system for performing the embodiment of the method illustrated in FIG. 3.

Referring to FIG. 4, an embodiment of a system for performing the method of FIG. 3 is illustrated. In this embodiment, the previously described gas mixture is directed to flow along a flow path 406 which enters a furnace 402 at entry point 408, intersects a reaction zone 404 within the furnace, exits the furnace at exit point 310, and (optionally) re-enters the furnace at entry point 408. The flow along the flow path may be continuous, semi-continuous, intermittent, or one-time. The previously described suspension is introduced into the gas flow through atomizer 412. A heat source 405 heats the reaction zone to the previously described temperature range. The gas flow carries the suspension through the reaction zone one or more iterations for a cumulative time of between about 5 seconds and 240 minutes. Consequently, the catalytic sites form on the surface of the carbon black particles.

Alternatively or in addition, this high-throughput production method can be practiced at the previously described production rate.

In a further embodiment, carbon black particles and particles of the metal precursor are mixed in a solvent to form a fluidized bed, whereby the metal precursor is absorbed by, adsorbed by, and/or coats the carbon black particles. The particles and metal precursor are then separated out from the liquid solvent, through filtering and the like. Meanwhile, a gas mixture comprising a nitrogen-containing gas and carrier gas is caused to continuously, semi-continuously, intermittently, or in batch mode, flow along a flow path which enters the bottom of a vertical tube containing a reaction zone maintained at a temperature between about 600 and 1000° Celsius. The flow path exits the top of the tube and optionally re-enters the bottom of the tube. The particles are introduced into the flowing gas, whereupon they enter and remain in the reaction zone for a time between about 5 second and 240 minutes. Through this process, the catalytic sites are formed on the surface of the particles. Through the force of the flowing gas, the particles move up the inner surface of the tube until they reach the top thereof. At this point, through the action of gravity, the particles may fall back down towards the bottom of the tube or, alternatively, blown out of the top of the tube. The gas flow may then be ceased. The formed particles may be removed upon cessation of the gas flow, or, additionally or alternatively, by blowing particles out of the top of the tube to a collector.

In a further embodiment, a rotating kiln is placed on its side at a slight incline from the horizontal. Again, a gas mixture is caused to flow along a flow path through a reaction zone maintained in the kiln at a temperature of about 600 to 1000° Celsius. Particles are introduced to a metal precursor as in the previous embodiment, which is then absorbed by, adsorbed by, and/or coats the carbon particles. The treated particles are then introduced into the kiln. Through the rotation of the kiln the particles are carried up the sidewall of the kiln tube and cascade down under the force of gravity, thus increasing contact between gas and particles. The force of the flowing gas gradually moves the particle along the length of the kiln tube, such that they remain in the reaction zone in the presence of the nitrogen-containing gas for a time between about 5 seconds and 240 minutes. Through this process, catalytic sites form on the surface of the particles. The kiln is inclined against the flowing gas such as to give an uphill travel for the flowing gas and any entrained carbon based particles. This incline impedes the movement of the particles out of the reaction zone by the force of gravity. The incline will be adjustable to offer more or less resistance to particle translation and can also be used to charge reagents or discharge products.

In yet another embodiment, the particles are again introduced to a metal precursor, which is absorbed by, adsorbed by, and/or coats the particles. The treated particles are then dispersed over a supporting surface within a container having a large surface area. The container is placed within a furnace in proximity to a reaction zone with a temperature in the range(s) from about 600 to 1000° C. A nitrogen-containing gas is allowed to flow across the treated particles while dispersed on the supporting surface. The particles are maintained in the reaction zone in the presence of the gas for a time between about 5 seconds and 240 minutes. Through this process, catalytic sites form on the surface of the particles.

In each of these embodiments, this high-throughput production method can be practiced at the previously described production rate.

In one aspect of the invention, the suspension may be entrained in the gas mixture. As employed herein, the term "entrain" means integrating a substance or material within another substance or material to form an integral or cohesive whole.

Moreover, in a further aspect of the invention, the suspension may be formed by atomizing a carbon black containing fluid and a metal salt containing fluid, which are independently selected from the group consisting of organic fluids and aqueous fluids. In addition, an atomizer may form the suspension by ultrasound, or aerosol. As employed herein, the term "atomizer" includes an instrument or device for reducing a substance to minute particles or a fine spray. As utilized herein, the term "ultrasound" includes vibration of the same physical nature as sound but at frequencies above the range of human hearing. As utilized herein, the term "aerosol" includes a suspension of fine solid or liquid particles in gas. In another aspect of the invention, the furnace may be selected from the group consisting of resistively heated furnaces, microwave-based furnaces, induction-based furnaces, infrared-based furnaces, flame-based furnaces, and suitable combinations thereof.

Moreover, in an additional aspect of the invention, the desired temperature may be achieved by adjusting the temperature of the furnace or heat source and/or gas mixture flow rate, or both. As utilized herein, the phrase "gas mixture flow rate" means a flow rate sufficient to ensure that the temperature at the surface of the atomized carbon black/metal salt fluid suspension or carbon particles is in the range(s) from about 600 to about 1000 degrees Celsius for a time in the range(s) from about 5 seconds to about 240 minutes, depending on the length of the reaction zone of the furnace.

The catalyst in accordance with the invention may be suitable for use in any oxygen-reduction cathode, including without limitation, oxygen-reduction cathodes suitable for use in a battery, oxygen-reduction cathodes suitable for use in a fuel cell, and oxygen-reduction cathodes suitable for use in a chlor alkali process for generating chlorine and base from a solution of alkali chloride (e.g. NaCl, KCl, or the like, or suitable combinations thereof) using a membrane. As used herein, the term "battery" refers to an energy source which generates energy through one or more ionic reactions but is non-refuelable, while the term "fuel cell" refers to an energy source which generates energy through one or more ionic reactions but is refuelable Moreover, the fuel cell may comprise a member of the group selected from metal-based fuel cells and hydrogen-based fuel cells. As used herein, the phrase "metal-based fuel cell" refers to a fuel cell where the fuel is a metal, while the phrase "hydrogen-based fuel cell" refers to a fuel cell where the fuel is hydrogen. Exemplary fuel cells contemplated as suitable for use in accordance with the invention are described above in the section entitled "Introduction to Fuel Cells".

Alternatively or in addition, the fuel cell may comprise a member from the group comprising an acid-based fuel cell and an alkaline-based fuel cell.

Alternatively or in addition, the fuel cell may comprise a member of the group selected from metal-based fuel cells.

Alternatively or in addition, the fuel cell may comprise a zinc-air fuel cell.

As utilized herein, the term "about" comprises any deviation upward or downward from the value modified by "about" by up to 20% of such value.

As employed herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

As utilized herein, the term "significantly faster" comprises any increase in the time value modified by "significantly faster" that is in the range(s) greater than 10% of such time value.

While various embodiments of the invention have been described, it will be apparent to those of ordinary skill in the art that many more embodiments and implementations are possible that are within the scope of this invention.

What is claimed is:

1. An oxygen reduction catalyst comprising (a) about 95 wt % to about 99.9 wt % carbon black, and (b) about 0.1 wt % to about 5.0 wt % metal, and (c) about 0.05 wt % to about 5.0 wt % nitrogen derived from non-polymerized molecules.

2. The catalyst of claim 1 in the form of a collection of catalyst particles.

3. The collection of claim 2 comprising not less than about 5 grams of such particles.

4. The collection of claim 2 wherein the particles are distributed in reasonably close proximity to each other.

5. The collection of claim 2, wherein the particles are distributed in the collection in an arrangement suitable for commercial distribution.

6. The collection of claim 2, wherein the particles are distributed in the collection as a supported matrix.

7. The collection of claim 6, wherein the distribution of the particles in the supported matrix is uniform.

8. The collection of claim 6, wherein the distribution of the particles in the supported matrix is random.

9. The collection of claim 6, wherein the supported matrix comprises an oxygen reduction cathode or a near-planar array.

10. The collection of claim 9, wherein the supported matrix comprises a near-planar array having a thickness in the range from about 0.0001 cm to about 10 cm and an area in the range from about 100 $cm^2$ to about 500 $m^2$.

11. The collection of claim 2, wherein the collection comprises in the range from about 5 grams of such particles to about 10000 kilograms of such particles.

12. The collection of claim 2, wherein the collection comprises in the range from about 10 grams of such particles to about 10 kilograms of such particles.

13. The collection of claim 2, wherein the collection comprises in the range from about 10 grams of such particles to about 50 grams of such particles.

14. The catalyst of claim 1, wherein the carbon black comprises exactly one property selected from the group consisting of a surface area of not less than 200 m²/gm, a resistivity of not greater than 0.01 Ω-cm, and an internal volume (DBP absorption test) of not less than 150 cm$^{3/100}$ gm.

15. The catalyst of claim 1, wherein the carbon black comprises exactly two properties selected from the group consisting of a surface area of not less than 200 m²/gm, a resistivity of not greater than 0.01 Ω-cm, and an internal volume (DBP absorption test) of not less than 150 cm$^{3/100}$ gm.

16. The catalyst of claim 1, wherein the carbon black comprises a surface area of not less than 200 m²/gm, a resistivity of not greater than 0.01 Ω-cm, and an internal volume (DBP absorption test) of not less than 150 cm$^{3/100}$ gm.

17. The catalyst of claim 1, wherein the metal comprises a member of the group consisting of Fe, Co, Ru, Mn, Zn, Mo, Cr, Cu, V, Ni, Rh, and suitable combinations thereof.

18. The catalyst of claim 17, wherein the metal comprises Fe.

19. A method of making a catalyst, the method comprising:
providing carbon black, one or more metal-containing and/or nitrogen-containing precursor(s), and a reducing agent to a reaction zone; and
heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes.

20. The method of claim 19 wherein the carbon black comprises exactly one property selected from the group consisting of a surface area of not less than 200 m²/gm, a resistivity of not greater than 0.01 Ω-cm, and an internal volume (DBP absorption test) of not less than 150 cm$^{3/100}$ gm.

21. The method of claim 19 wherein the carbon black comprises exactly two properties selected from the group consisting of a surface area of not less than 200 m²/gm, a resistivity of not greater than 0.01 Ω-cm, and an internal volume (DBP absorption test) of not less than 150 cm$^{3/100}$ gm.

22. The method of claim 19 wherein the carbon black comprises a surface area of not less than 200 m¹ gm, a resistivity of not greater than 0.01 Ω-cm, and an internal volume (DBP absorption test) of not less than 150 cm$^{3/100}$ gm.

23. The method of claim 19 wherein the one or more metal-containing and/or nitrogen-containing precursor(s) comprises at least one precursor comprising a metal and at least one precursor comprising a nitrogen.

24. The method of claim 23 wherein the metal is selected from the group consisting of alkali elements, alkali salts, alkali-containing compounds, alkaline earth elements, alkaline earth salts, alkaline earth-containing compounds, transition block elements, transition block salts, transition block-containing compounds, lanthanoid block elements, lanthanoid block salts, lanthanoid block-containing compounds, actinoid block elements, actinoid block salts, actinoid block-containing compounds, and suitable combinations thereof.

25. The method of claim 24, wherein the metal is selected from the group consisting of Fe, Fe salts, Fe-containing compounds, Co, Co salts, Co-containing compounds, Ru, Ru salts, Ru-containing compounds, Mn, Mn salts, Mn-containing compounds, Zn, Zn salts, Zn-containing compounds, Mo, Mo salts, Mo-containing compounds, Cr, Cr salts, Cr-containing compounds, Cu, Cu salts, Cu-containing compounds, V, V salts, V-containing compounds, Ni, Ni salts, Ni-containing compounds, Rh, Rh salts, Rh-containing compounds, and suitable combinations of any two or more thereof.

26. The method of claim 24, wherein the metal is selected from the group consisting of Fe, Fe salts, Fe-containing compounds, and suitable combinations of any two or more thereof.

27. The method of claim 23 wherein the nitrogen comprises ammonia, acetonitrile, hydrazine, pyrrole, urea, any nitrogen-salt or nitrogen-containing compound that can serve as a nitrogen donor to a metal at a temperature in the range from about 600 to about 1000 degrees Celsius, and suitable combinations thereof.

28. The method of claim 19 wherein the one or more metal-containing and/or nitrogen-containing precursor(s) comprises at least one precursor comprising both a metal and a nitrogen.

29. The method of claim 28 wherein the precursor comprising both a metal and a nitrogen comprises a metal macrocycle comprising a metal and a nitrogen.

30. The method of claim 29 wherein the metal is Fe.

31. The method of claim 19 wherein the reducing agent is selected from the group comprising hydrogen, carbon monoxide, any gas that can serve to provide a reducing atmosphere at a temperature in the range(s) from about 600 to about 1000 degrees Celsius, and suitable combinations of any two or more thereof.

32. The method of claim 19, further comprising providing a gas mixture comprising a carrier gas, a nitrogen-containing precursor comprising a nitrogen-containing gas, and a reducing agent comprising a reducing gas to the reaction zone.

33. The method of claim 32, further comprising providing a metal precursor comprising a metal salt fluid to the reaction zone.

34. The method of claim 33, further comprising combining carbon black particles and the metal salt fluid to form an atomized carbon black/metal fluid suspension that is introduced to the reaction zone.

35. The method of claim 34, further comprising entraining the suspension in the gas mixture.

36. The method of claim 34, further comprising causing the gas mixture to flow along a flow path through the reaction zone, and introducing the suspension to the reaction zone through the flow of the gas mixture.

37. The method of claim 34, further comprising forming the atomized carbon black/metal fluid suspension using an atomizer.

38. The method of claim 37, wherein the atomizer forms the atomized carbon black/metal fluid suspension by atomizing a carbon black containing fluid and a metal containing fluid.

39. The method of claim 38, wherein the atomizer forms the atomized carbon black/metal fluid suspension by ultrasound or aerosol.

40. The method of claim 34, wherein the carbon black comprises a fluid selected from the group consisting of organic fluids and aqueous fluids.

41. The method of claim 40, wherein the metal salt comprises a metal salt containing fluid independently selected from the group consisting of organic fluids and aqueous fluids.

42. The method of claim 32 further comprising forming the gas mixture prior to heating -the gas mixture.

43. The method of claim 19, further comprising employing the catalyst in an oxygen-reduction cathode.

44. The method of claim 43, further comprising employing the catalyst in an oxygen-reduction cathode in a battery.

45. The method of claim 43, further comprising employing the catalyst in an oxygen-reduction cathode in a fuel cell.

46. The method of claim 45, further comprising employing the catalyst in a fuel cell which comprises a member of the group selected from metal-based fuel cells and hydrogen-based fuel cells.

47. The method of claim 45, further comprising employing the catalyst in a fuel cell comprising a member selected from the group consisting of acid-based fuel cells and alkaline-based fuel cells.

48. The method of claim 45, further comprising employing the catalyst in a fuel cell comprising a member of the group selected from metal-based fuel cells.

49. The method of claim 45, further comprising employing the catalyst in a fuel cell comprising a zinc-air fuel cell.

50. The method of claim 43, further comprising employing the catalyst in an oxygen-reduction cathode in a chlor alkali process for generating chlorine and base from a solution of alkali chloride using a membrane.

51. A method of making a catalyst, the method comprising:
    providing carbon black, one or more metal-containing and/or nitrogen-containing precursor(s), and an optional reducing agent to a reaction zone;
    heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes; and
    maintaining the temperature in the reaction zone via heating with a heat source.

52. The method of claim 51 wherein the heat source comprises a furnace.

53. The method of claim 52, wherein the furnace is selected from the group consisting of resistively heated furnaces, microwave-based furnaces, induction-based furnaces, infrared-based furnaces, flame-based furnaces, and suitable combinations thereof.

54. The method of claim 53, wherein the temperature is achieved by adjusting the furnace temperature and/or adjustment of the reactant flow rate through the reaction zone.

55. A method of making a catalyst, the method comprising:
    providing carbon black, one or more metal-containing and/or nitrogen-containing precursor(s), and an optional reducing agent to a reaction zone;
    heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes; and
    introducing a carrier gas to the reaction zone, wherein the carrier gas comprises nitrogen, argon, helium, or suitable combinations thereof.

56. A method of making a catalyst, the method comprising:
    providing carbon black, one or more metal-containing and/or nitrogen-containing precursor(s), and an optional reducing agent to a reaction zone, wherein the one or more metal-containing and/or nitrogen-containing precursor(s) comprises at least one precursor comprising a metal and at least one precursor comprising a nitrogen, and the nitrogen-containing precursor comprises ammonia; and
    heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes.

57. A method of making particles of a catalyst, the method comprising:
    providing carbon black, one or more metal-containing and/or nitrogen-containing precursor(s), and an optional reducing agent to a reaction zone;
    heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes; and
    producing the particles at a production rate of not less than about 10 grams per day.

58. The method of claim 57, wherein the particles are produced at a production rate of not less than about 100 grams per day.

59. The method of claim 57, wherein the particles are produced at a production rate of not less than about 1000 grams per day.

60. A method of making particles of a catalyst, the method comprising:
    providing carbon black, one or more metal-containing and/or nitrogen-containing precursor(s), and an optional reducing agent to a reaction zone;
    heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes; and
    producing the particles at a production rate in the range from about 10 grams per day to about 100 kilograms per hour.

61. A method of making a catalyst, the method comprising:
    providing carbon black, one or more metal-containing and/or nitrogen-containing precursor(s), and an optional reducing agent to a reaction zone;
    heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes; and
    maintaining the reaction zone vertical tube surrounded in part by a heating element.

62. A method of making a catalyst, the method comprising:

providing carbon black, one or more metal-containing and/or nitrogen-containing precursor(s), and an optional reducing agent to a reaction zone;

heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes; and maintaining the reaction zone rotating kiln tilted at an angle from the horizontal.

63. A method of making a catalyst, the method comprising:

providing carbon black, one or more metal-containing and/or nitrogen-containing precursor(s), and an optional reducing agent to a reaction zone;

heating the reaction zone to a temperature of between about 600 and about 1000 degrees Celsius and maintaining the carbon black, the one or more metal-containing and/or nitrogen-containing precursor(s), and the reducing agent in the reaction zone while so heated for a cumulative time in the range from between about 5 seconds and about 240 minutes; and providing carbon black particles widely dispersed over a supporting surface to the reaction zone.

64. A method of making a catalyst, comprising:

entraining an atomized carbon black/metal salt fluid suspension in a gas mixture comprising a nitrogen-containing gas, a reducing gas, and a carrier gas;

directing the gas mixture and entrained suspension along a flow path past a heat source;

heating the gas mixture and entrained suspension so that the temperature at the surface of the atomized carbon black/metal salt fluid suspension is in the range from about 600 to about 1000 degrees Celsius; and heating the gas mixture and entrained suspension for a cumulative time in the range from about 5 seconds to about 240 minutes.

* * * * *